T. M. HOSKINS.
AUTO SIGNAL.
APPLICATION FILED MAY 8, 1918.
1,403,782.
Patented Jan. 17, 1922.
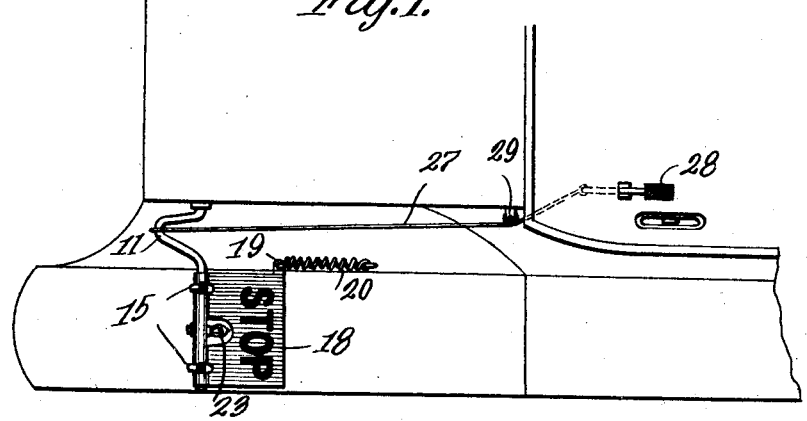
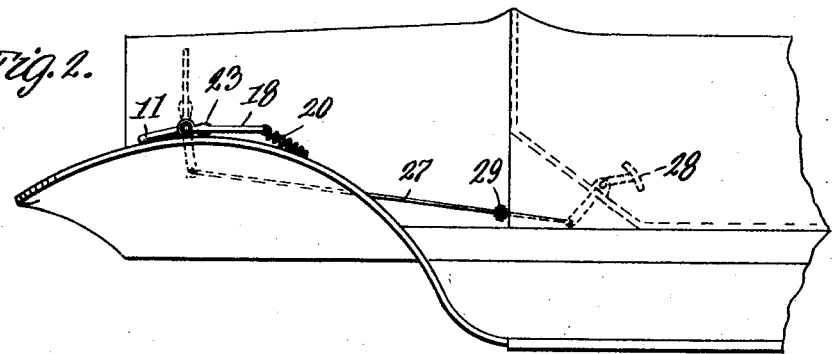
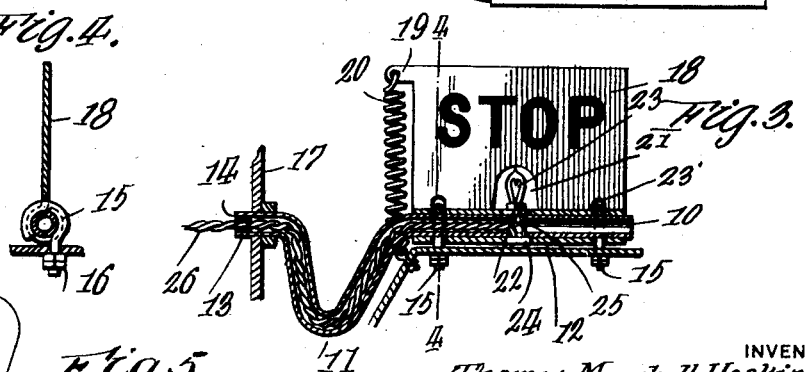
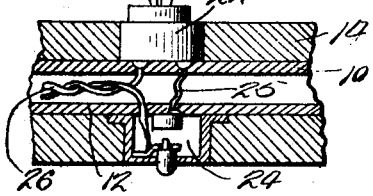
INVENTOR
Thomas Marshall Hoskins.
BY Richard B. Owen.
ATTORNEY

UNITED STATES PATENT OFFICE.

THOMAS MARSHALL HOSKINS, OF EVANSVILLE, INDIANA.

AUTO SIGNAL.

1,403,782.   Specification of Letters Patent.   Patented Jan. 17, 1922.

Application filed May 8, 1918. Serial No. 233,274.

*To all whom it may concern:*

Be it known that I, THOMAS MARSHALL HOSKINS, a citizen of the United States, residing at Evansville, in the county of Vanderburg and State of Indiana, have invented certain new and useful Improvements in Auto Signals, of which the following is a specification.

This invention has relation to automobile signals, and the nature and objects thereof will be readily apparent to those skilled in the art to which it appertains in the light of the following explanation of the accompanying drawings, illustrating what I now believe to be the preferred embodiment, or mechanical expression of my invention from among other forms and arrangements within the spirit thereof and the scope of the appended claims.

An object of the invention is to provide an automobile signal designed to be mounted upon one of the fenders of the vehicle for movement to a visible position to display the same, at the will of the driver.

Another object of the invention is to provide an automobile signal of the character above set forth including a semaphore plate mounted for movement in a vertical plane and adapted to be mounted upon one of the fenders of the vehicle, and means operatively connected to the brake pedal to elevate the semaphore plate to a vertical position wherein it may be viewed simultaneously with the application of the brake.

A still further object of the invention is to provide a signal for motor vehicles of the character above set forth including a tubular shaft having a crank portion therein, and means for journaling the tubular shaft upon one of the fenders of the motor vehicle, the shaft carrying a semaphore plate with means for normally retaining the plate in a position wherein it is visible. Means being also provided for normally retaining the plate in a position wherein it is visible, means being also provided for operatively connecting the brake pedal with the crank portion whereby to rotate the shaft to dispose the plate to a position wherein it may be viewed simultaneously with the application of the brakes.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a fragmentary view in plan of a motor vehicle illustrating the application thereto of my invention.

Figure 2, is a similar view in side elevation.

Figure 3, is a detail view in section illustrating the section of the semaphore plate and correlated parts, and Figure 4, is a vertical section taken on line 4—4 of Figure 3.

Before proceeding with the description it will be obvious that although as herein disclosed the signal is mounted upon the left hand fender of the motor vehicle, the parts may be reversed to permit the signal to be mounted upon the right hand fender, and either in the rear or front of the vehicle as desired.

The device consists essentially of a tubular shaft 10 having a crank portion 11 formed at one end, defining a long end 12 and a short end 13, said short end being closed by means of an apertured plug of insulating material 14. The long end of the shaft is placed transversely of the fender and superposed thereupon, and journaled by means of eyebolts 15 of which a pair are provided in spaced relation receiving the tubular shaft, the threaded portion of the bolt extending through an opening formed in the fender whereby a nut 16 may be applied thereto to retain the bolt in position. It will be obvious that the tubular shaft is thus journaled for rotation and the crank portion 11 is preferably normally disposed in a depending position as illustrated. The short end of the tubular shaft is journaled in the hood 17, being seated in an opening formed therein whereby the said end of the tubular member may extend into the hood for a purpose which will be presently noted. Mounted upon the long end of the tubular shaft is a blade or semaphore plate 18. The plate may be secured to the shaft by any suitable means and is provided at one margin with an integrally formed lug, apertured to receive one end of a coil spring 20, the other end of the coil spring being connected to the fender to normally retain the plate in a horizontal position in contact with the fender wherein the plate will be invisible. The plate, adjacent its point of connection to the tubular shaft, and intermediate its ends is formed with an opening 21. A socket 22 is mounted on the tubular shaft within the opening to receive an incandescent globe 23 which globe is thus disposed within the opening 21. It will be noted that the plate 18 is secured to the tubular member by wrapping one margin of the plate around the tubular member said plate being provided with openings aligning with circumferential grooves formed in the roll portion of the plate and indicated at 23' wherein to receive the eye-bolts 15. The tubular shaft 10 as well as the roll portion of the plate is formed with registering openings at a point diametrically opposite the location of the socket 22 to receive an ordinary push button casing 24 mounted therein having a push button which projects beyond the surface of the rolled portion of the plate. One terminal of the socket 22 is connected to one binding post of the push button by means of a conductor 25. A pair of conductors 26 are then connected to the remaining terminals and binding posts of the socket 22 and push button 24, and said wires 26 lead to a source of current (not shown). A flexible element indicated at 27 is connected at one end to the brake pedal 28 after passing the element over a pulley 29, the other end of the element being connected to the crank portion 11 of the tubular shaft.

In operation, it will be apparent that the crank portion 11 is normally extended in a depending and forwardly directed position whereby to dispose the semaphore plate 18 in a horizontal position in contact with the fender so that it may not be visible to persons in front of the motor vehicle bearing the signal. The coil spring 20 acts to retain the semaphore plate normally in the position named. When the brake pedal of the vehicle is pushed forward to apply the brake, it will be obvious that the flexible element 27 will be torsioned thereby rocking the tubular shaft upon its bearing with the result that the plate 18 is moved to a vertical position against the tension of the spring 20 carrying the incandescent lamp therewith. When the tubular shaft is thus rotated the button 24 of the push button will be contacted with the upper surface of the fender, thereby pushing the button inwardly with the result that the circuit is completed through the source of current and incandescent lamp, thereby illuminating the lamp and displaying a slogan of warning printed or otherwise formed upon the front face of the semaphore plate. When the brake pedal is released the coil spring 20 will act to return the plates to normal position and obviously, when the push button is released the circuit will be broken and the lamp extinguished.

The foregoing description and the drawings have reference to what may be considered the preferred, or approved form of my invention. It is to be understood that I may make such changes in construction and arrangement and combination of parts, materials, dimensions, etc., as may prove expedient and fall within the scope of the appended claims.

Having thus described my invention what I claim as new and desire to secure by Letters Patent is:—

1. An automobile signal comprising a shaft adapted to be journaled upon an object to rotate in a plane approximately parallel thereto, a semaphore secured to said shaft, a light carried by said shaft, a push button carried by said shaft and operable by contact with the object for lighting the light when the semaphore is in a display position, and means for normally retaining said semaphore in an inoperative position.

2. The combination with an auto fender, of a tubular shaft journaled upon said fender, a semaphore plate having one edge rolled about the tubular shaft said plate having in its inner portion a central opening, and an opening at each end, eye bolts forming bearings embracing the tubular shaft and entering the end openings of the plate, a lamp socket mounted on the shaft and located within the central opening of the plate, a lamp inserted in said socket, a circuit closer on the shaft, conductors extending through the tubular shaft and connected with said circuit closer and lamp socket, and means for operating said shaft to extend the semaphore in a vertical position and to contact the circuit closer with the upper face of said fender.

In testimony whereof I affix my signature in presence of two witnesses.

THOMAS MARSHALL HOSKINS.

Witnesses:
ADA COMPTON,
M. ROSE.